United States Patent [19]

Miyazawa et al.

[11] Patent Number: 5,210,562
[45] Date of Patent: May 11, 1993

[54] MOTOR DRIVING CONTROL APPARATUS WITH MOVEMENT DISTANCE ESTIMATING FUNCTION

[75] Inventors: Azuma Miyazawa, Mitaka; Kozi Mizobuchi, Hachioji, both of Japan

[73] Assignee: Olympus Optical Co., Ltd., Tokyo, Japan

[21] Appl. No.: 755,020

[22] Filed: Sep. 4, 1991

[30] Foreign Application Priority Data

Sep. 17, 1990 [JP] Japan .................................. 2-246440

[51] Int. Cl.$^5$ ........................ G03B 1/00; G03B 13/36; G05B 19/29
[52] U.S. Cl. ................................. 354/400; 354/195.1; 354/173.1; 318/603; 318/618; 318/636; 318/685
[58] Field of Search .................... 354/400, 195.1, 173.1, 354/173.11; 318/685, 603, 616, 617, 618, 636, 601

[56] References Cited

U.S. PATENT DOCUMENTS 4,878,077 10/1989 Maeno et al. ...................... 354/400
5,057,859 10/1991 Ishimaru et al. ..................... 354/400

FOREIGN PATENT DOCUMENTS 0092832 11/1983 European Pat. Off. .

OTHER PUBLICATIONS

"Application of Fuzzy Algorithms for Control of Simple Dynamic Plant", Proc. IEE, vol. 121, No. 12, Dec. 1974, by E. H. Mamdani; pp. 1585–1588.

Primary Examiner—W. B. Perkey
Attorney, Agent, or Firm—Frishauf, Holtz, Goodman & Woodward

[57] ABSTRACT

A target position output unit outputs stop target position information of a driven member which is driven by a motor. A speed detecting unit outputs movement speed data of the driven member in accordance with a pulse from an encoder which generates a pulse in response to a movement of the driven member. A movement distance arithmetic operation unit performs an estimative arithmetic operation of a movement distance of the driven member until stopping when the motor is caused to stop immediately, in accordance with the last and current movement speed data. A stop position arithmetic operation unit adds the movement distance calculated by the movement distance arithmetic operation unit to the current position information of the driven member, thereby obtaining estimated stop position information of the driven member. A motor control unit controls the motor in accordance with a comparison result between the stop target position information and the estimated stop position information.

36 Claims, 12 Drawing Sheets

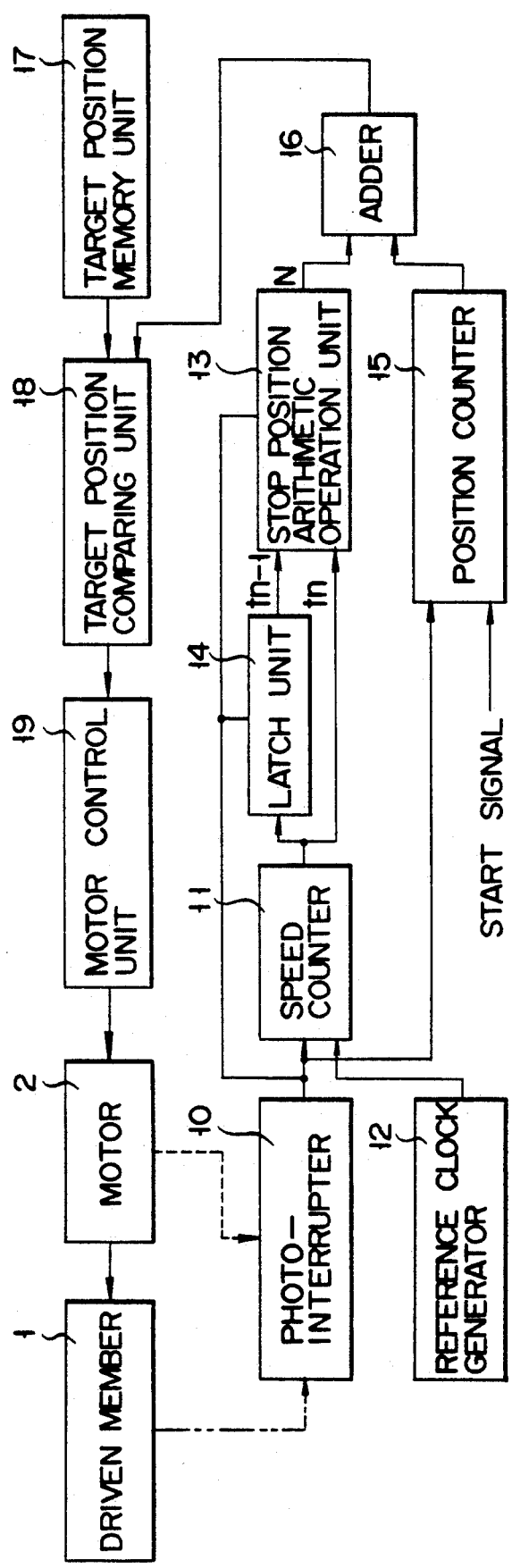
F I G. 2B
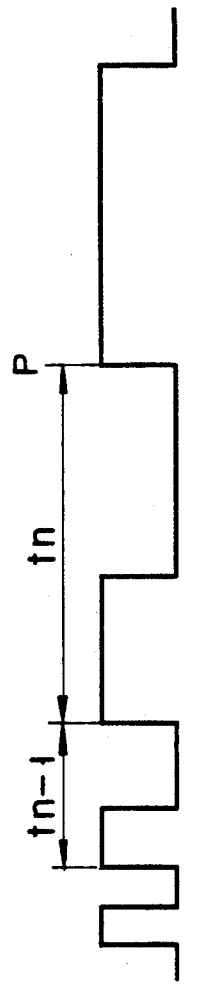
F I G. 3
PULSES GENERATED BY PHOTO-INTERRUPTER

| CURRENT TIME \ LAST TIME | S1 | S2 | S3 | S4 | S5 | S6 | S7 |
|---|---|---|---|---|---|---|---|
| S1 | D1 Ⓐ | | | | | | |
| S2 | | D4 | | D1 Ⓒ | | | |
| S3 | | | | D3 | | | |
| S4 | | | | D6 | | D5 | D2 |
| S5 | | | | | D6 | | |
| S6 | D6 Ⓑ | | D7 | | | | |
| S7 | | | | D7 | | | |

FIG. 6

| | CALCULATION RESULT OF ESTIMATED STOP POSITION WITH RESPECT TO TARGET POSITION | MOTOR |
|---|---|---|
| ① | FAR | ON |
| ② | FAR | ON |
| ③ | FAR | ON |
| ④ | SLIGHTLY BEFORE | OFF |
| ⑤ | SLIGHTLY BEFORE | OFF |
| ⑥ | FAR | ON |
| ⑦ | TARGET POSITION | BRAKED |

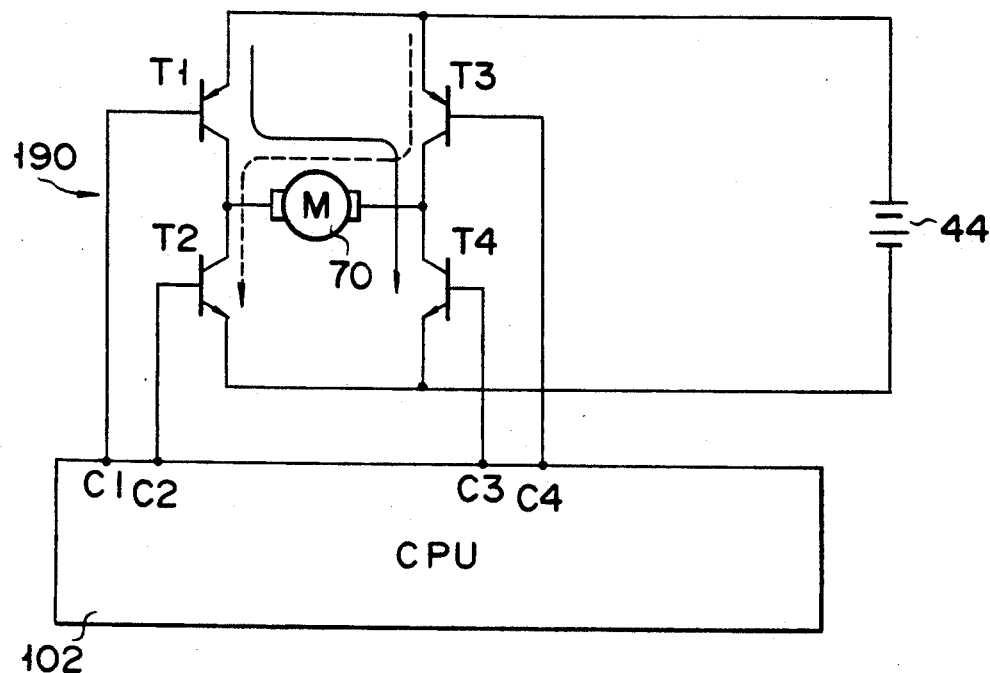
F I G. 8C
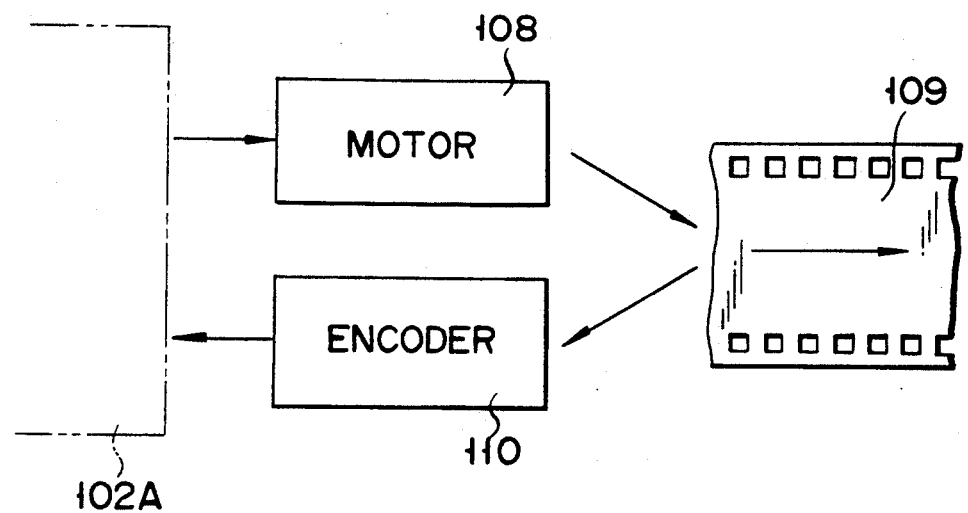
F I G. 9A

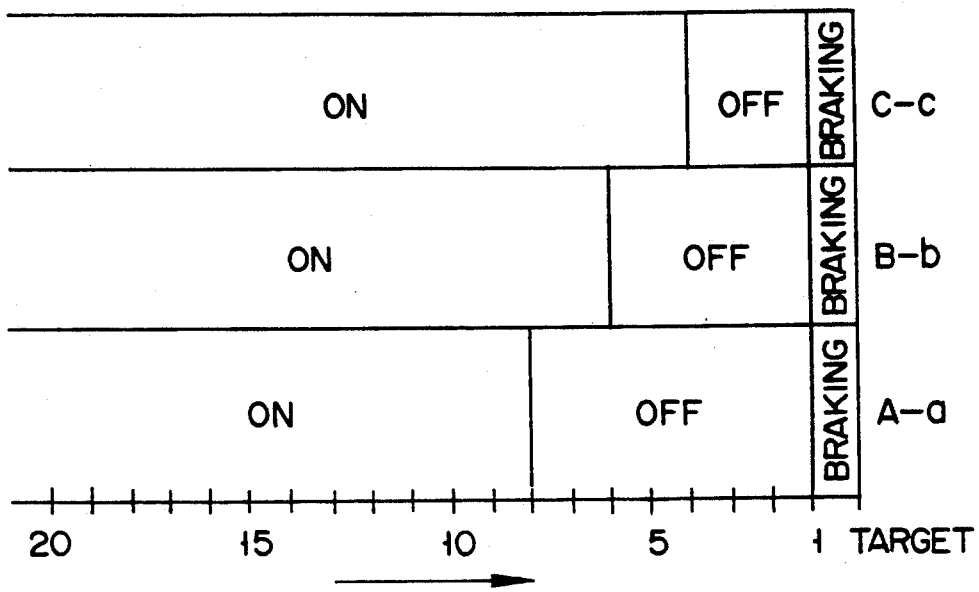
F I G. 12
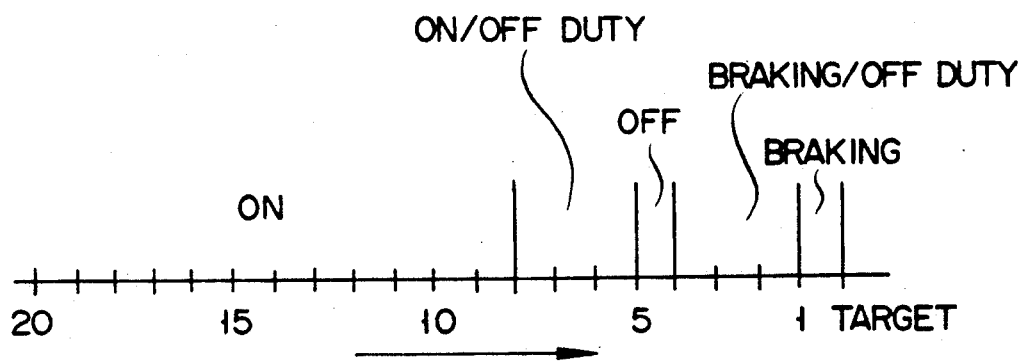
F I G. 13

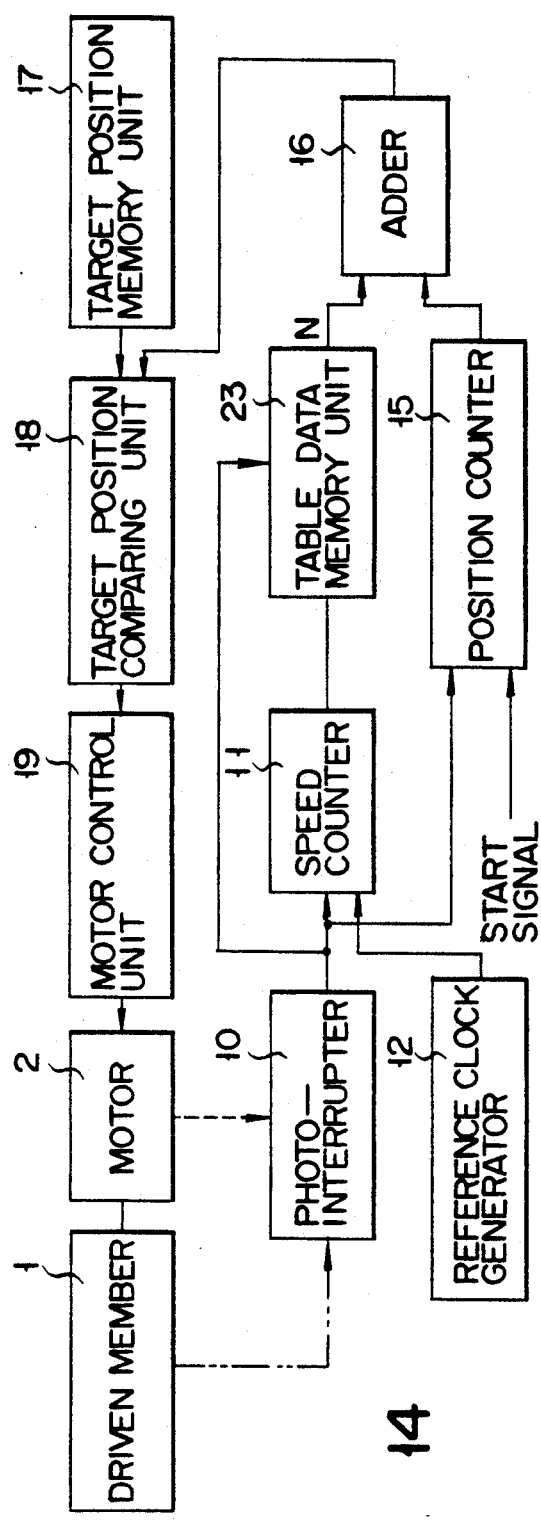
F I G. 14
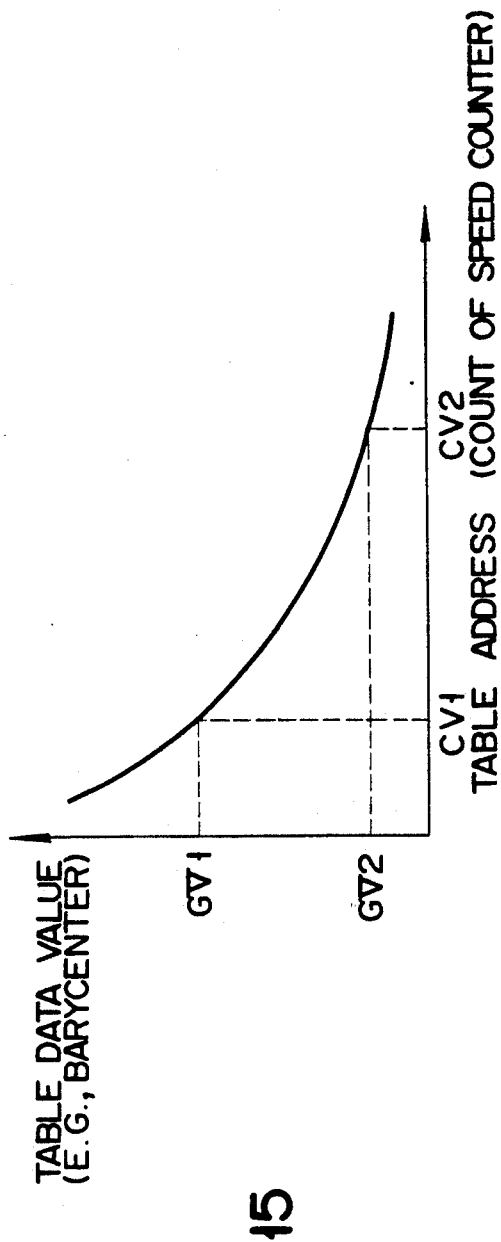
F I G. 15

MOTOR DRIVING CONTROL APPARATUS WITH MOVEMENT DISTANCE ESTIMATING FUNCTION

BACKGROUND OF THE INVENTION

1. Field of the Invention

The present invention generally relates to a motor driving control apparatus and, more particularly, to a motor driving control apparatus for controlling driving of a motor as a power source in order to move a driven member, e.g., a taking lens and a film, of a camera to a target position correctly and quickly.

2. Description of the Related Art

A motor driving control apparatus as described above is under development as a device in various fields that employ so-called mechanical-electronics (mechatronics).

For example, U.S. Pat. No. 4,878,077 discloses an apparatus for extending a taking lens and winding a film as a target position control apparatus which uses a photo-interrupter as a speed detecting means and which employs a motor.

In conventional examples, a driven member is controlled until reaching a target position along a prestored deceleration curve. More specifically, a predetermined deceleration curve down to a target position is stored. The stored deceleration curve is compared with a speed detection output. When the actual speed is higher than that represented by the deceleration curve, the motor is braked. When the actual speed is lower than that represented by the stored curve within a predetermined speed range, the motor is turned off. When the actual speed is lower than that represented by the stored curve below the lower limit of the predetermined speed range, the motor is turned on. The driven member is stopped at the target position in accordance with the stored deceleration curve by performing control in this manner. According to this control technique, hence, the driven member can be correctly stopped at the target position.

A deceleration curve used by such a control technique is usually determined under the following conditions. Under any condition, the driven member should not pass the target position. Under conditions wherein it is most difficult for the driven member to stop, i.e., during lens extension, when the lens faces down and the fluctuation in control voltage is maximum, the lens movement speed is set maximum. Thereafter, the motor is braked, and how the driven member is stopped (deceleration curve) is recorded. The recorded deceleration curve is added with some margin and is recorded as a final deceleration curve. As a result, the lens will not pass the target position under any condition and can stop at the target position in the first attempt.

However, the conventional control technique has the following drawbacks. More specifically, the deceleration curve is based on a worst case. Therefore, in a normal case (when lens is set horizontal), the motor can be braked too easily, and the deceleration curve has an excessive margin. Braking occurs too early, resulting in an increased number of braking and OFF/ON times of the motor. As a result, the time is wasted, resulting in a considerably prolonged entire control time. Then, in a camera, particularly, a time lag after a release button is depressed is prolonged, which is not preferable.

SUMMARY OF THE INVENTION

It is, therefore, an object of the present invention to provide a new and improved motor driving control apparatus which is capable of stopping a driven member at a target position correctly and quickly while shortening a control time by decreasing a number of ON/OFF and braking control times of a motor.

According to one aspect of the present invention, there is provided a motor driving control apparatus comprising:

a motor for driving a driven member;

target position output means for outputting stop target position information of the driven member;

encoder means for generating pulses in accordance with a movement of the driven member;

speed detecting means for detecting a speed of the driven member by using the pulses from the encoder means and for outputting speed data;

memory means for storing the speed data output by the speed detecting means;

movement distance arithmetic operation means for estimating and calculating a movement distance of the driven member until stopping by using the speed data stored in the memory means and current speed data detected by the speed detecting means when a motor stop operation is immediately started;

position detecting means for detecting current position information of the driven member by counting the pulses from the encoder means;

stop position arithmetic operating means for calculating estimated stop position information of the driven member by adding the current position information of the driven member, which is detected by the position detecting means, with the movement distance until stopping which is calculated by the movement distance arithmetic operating means;

comparing means for comparing stop target position information output by the target position output means with the estimated stop position information calculated by the stop position arithmetic operating means; and motor control means for controlling the motor in accordance with a result of the comparing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2B is a block diagram schematically showing the basic structure of the motor driving control apparatus according to the embodiment of FIG. 1;

FIG. 3 shows pulses generated by a photo-interrupter;

FIG. 6 shows a table showing an example of rules formed by utilizing the membership functions;

FIG. 8C shows a practical arrangement of a motor control unit;

FIG. 9A shows a general idea of a camera film wind system according to another embodiment of the present invention;

FIG. 12 is a view for explaining control determination based on the motor characteristics;

FIG. 13 shows an operation example in which duty driving is added to the motor control operation;

FIG. 14 is a block diagram schematically showing a motor driving control apparatus according to still another embodiment of the present invention;

FIG. 15 is a graph showing actual designation of a table value of a table data memory unit in FIG. 14.

DETAILED DESCRIPTION OF THE PREFERRED EMBODIMENTS

Figure 1:
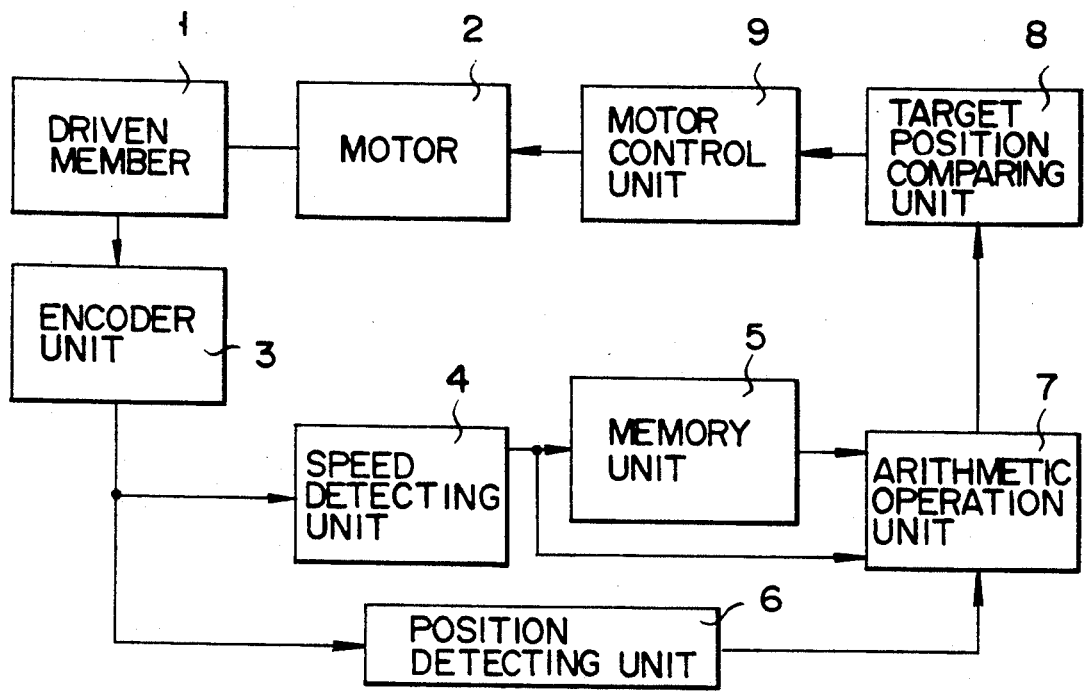
FIG. 1 is a block diagram schematically showing the basic structure of a motor driving control apparatus according to an embodiment of the present invention.

Reference will now be made in detail to the presently preferred embodiments of the invention as illustrated in the accompanying drawings, in which like reference characters designate like or corresponding parts throughout the several drawings.

FIG. 1 shows the basic structure of a motor driving control apparatus according to an embodiment of the present invention. More specifically, the motor driving control apparatus comprises a motor 2, an encoder unit 3, a speed detecting unit 4, a memory unit 5, a position detecting unit 6, an arithmetic operation unit 7, a target position comparing unit 8, and a motor control unit 9. The motor 2 drives a driven member 1 to a target position. The encoder unit 3 generates pulses in accordance with the movement of the driven member 1. The speed detecting unit 4 receives the pulses generated by the encoder unit 3 and detects the speed of the driven member 1. The memory unit 5 stores speed information of the driven member 1 detected by the speed detecting unit 4. The position detecting unit 6 detects the position of the driven member 1 by counting the pulses generated by the encoder unit 3 from the start of driving of the motor 2. The arithmetic operation unit 7 arithmetically estimates the driving stop position of the driven member 1 upon braking the motor 2 on the basis of the last speed information of the driven member 1 which is stored in the memory unit 5, the current speed information of the driven member 1 which is detected by the speed detecting unit 4, and the position information of the driven member 1 which is detected by the position detecting unit 6. The target position comparing unit 8 compares stop position information arithmetically estimated by the arithmetic operation unit 7 with information representing a distance to the target position. The motor control unit 9 performs at least ON control or braking control of the motor 2 based on the comparison result of the target position comparing unit 8.

Figure 2A:
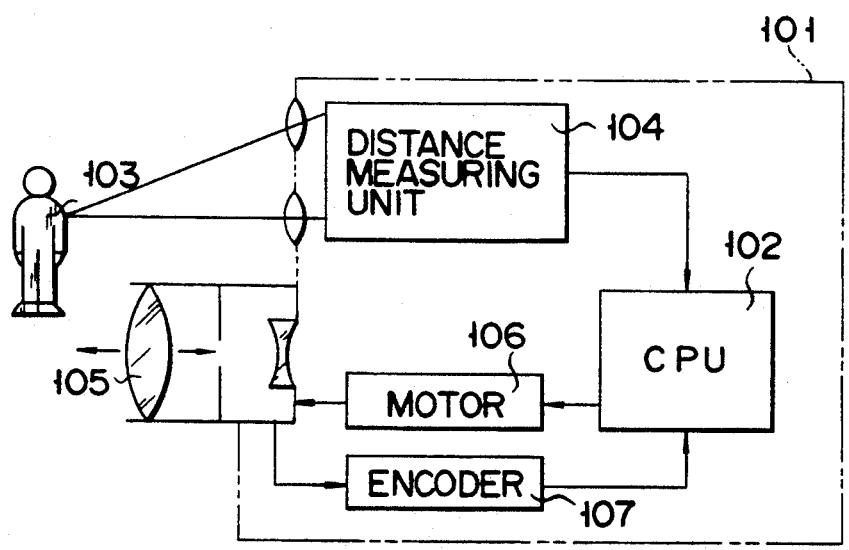
FIG. 2A is a schematic diagram showing an automatic focus adjusting unit of a camera according to the embodiment shown in FIG. 1.

FIG. 2A shows one embodiment of the invention applied to an automatic focus adjusting unit. A camera body 101 includes a CPU (central processing unit) 102 which receives information representing a distance to an object 103 being photographed, which is determined by a distance measuring unit 104 operating on the basis of trigonometry. In response thereto, the CPU 102 determines a travel of a taking lens 105 on the basis of such distance information, and turns on a lens driving motor 106 to begin moving the taking lens 105. The speed of movement and the travel of the taking lens 105 are fed back to the CPU 102 by an encoder 107 which comprises a photo-interrupter or the like.

FIG. 2B schematically shows the structure of an embodiment of the motor driving control apparatus of the present invention, in which portions associated with the CPU 102 in FIG. 2A are shown as functional blocks. A driven member 1 is, e.g., a photographing or taking lens (corresponding to the taking lens 105) of a camera or a film (to be described later). A photo-interrupter 10 corresponds to the encoder 3 or 107 described above and is arranged to generate a pulse every unit movement distance of the driven member 1. The interval (time) in which the pulses are generated by the photo-interrupter is measured by counting reference clock pulses generated by a reference clock generator 12 by a speed counter 11 included in the CPU 102, and is output as a measured value $t_n$. FIG. 3 shows the waveform of the output from the photo-interrupter 10. In this example, the time between a pulse leading edge and a pulse trailing edge is measured. However, a time between trailing edges or any other time interval of an edge change cycle may be measured instead.

The example of FIG. 3 in which measurement is performed at a point P will be described. The value $t_n$ measured by the speed counter 11 is input to a stop position arithmetic operation unit 13 included in the CPU 102, and is simultaneously stored in a latch unit 14. More specifically, the latch unit 14 is a memory means which stores a value tn newly measured in synchronism with the leading edge of the pulse from the photo-interrupter 10, and simultaneously outputs a previous measured value $t_{n-1}$.

The stop position arithmetic operation unit 13 receives the measured values $t_n$ and $t_{n-1}$ in synchronism with the leading edge of the pulse from the photo-interrupter 10 and starts calculation. This calculation is to determine, when the motor 2 is immediately braked, the number of pulses (the pulses generated by the photo-interrupter 10) to stop the motor 2. This calculation is performed by utilizing, e.g., the fuzzy inference which will be described later in detail. Calculation is performed in this manner, and the calculation result is output as N.

At the start of this control, in the case of a camera, camera reset is started by a start signal which is supplied upon release operation, and simultaneously the position counter 15 in the CPU 102, which counts the leading edges of the pulses from the photo-interrupter 10, starts operation. An output from the position counter 15 is supplied to an adder 16, included in the CPU 10, together with the calculation result N of the stop position arithmetic operation unit 13, and is added to the calculation result N. This estimated stop position information and target position information (to be described later) stored in a target position memory unit 17 (to be described later) are compared by a target position comparing unit 18 included in the CPU 102, and ON/OFF and braking states of the motor 2 are controlled by a motor control unit 19 (to be described later) based on the comparison result.

Figure 4:
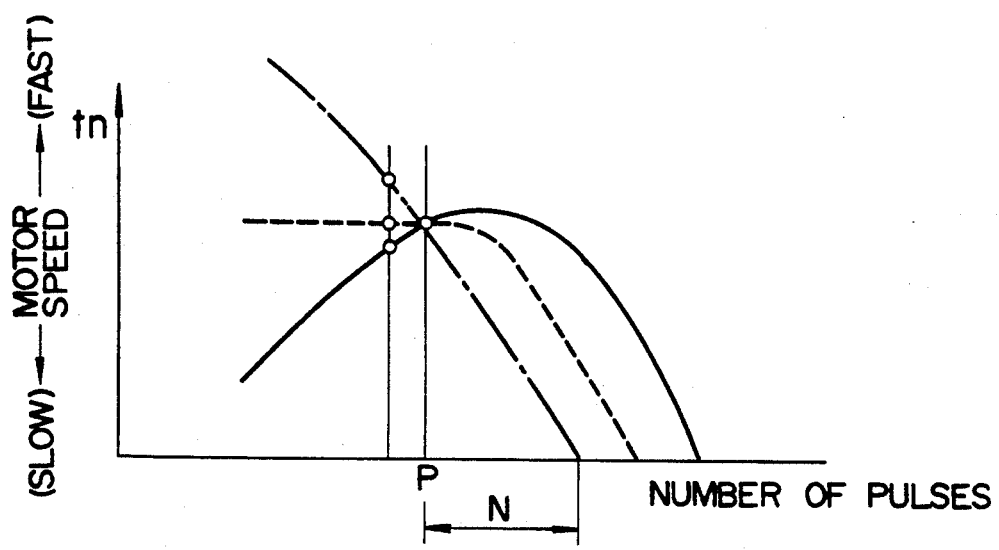
FIG. 4 is a graph for explaining a general motor stop curve.

The calculation scheme of the stop position arithmetic operation unit 13 will be described in detail. FIG. 4 shows how a general motor stops. The axis of abscissa represents the number of pulses generated by the photo-interrupter 10, and the axis of ordinate represents the interval $t_n$ of the pulses generated by the photo-interrupter 10. Higher along the axis of ordinate, higher the motor speed. The position of the point P represents the currently measured position. The solid line represents an accelerated motion, a broken line represents a substantially uniform motion, and a long and short dashed line represents a decelerated motion. In either motion, the speed is the same at the measurement time point. It is apparent from experience as well that, when the motor 2 is braked at the point P, the number of pulses N of the photo-interrupter 10 from this time point until stop is larger (the distance is longer) in the order of the decelerated motion, the uniform motion, and the accelerated motion. It is not practical to apply this fact to a general formula as too many parameters are needed.

Hence, in this embodiment, the fuzzy inference is applied on the basis of the above characteristics to obtain a stop position.

Figure 5A:
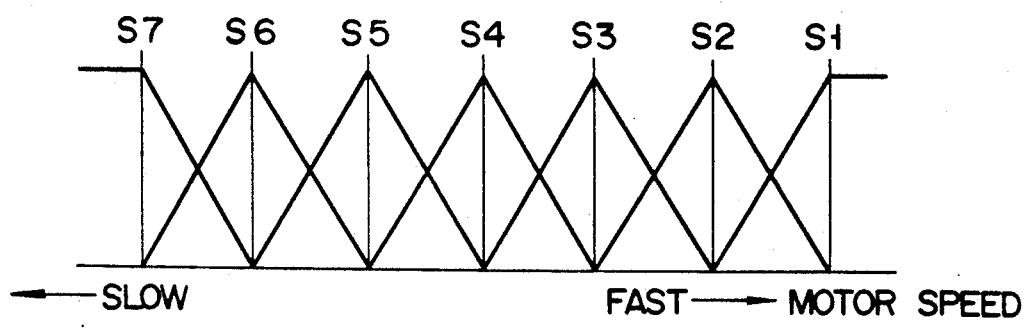
FIGS. 5A and 5B show membership functions for executing a fuzzy inference.
Figure 5B:
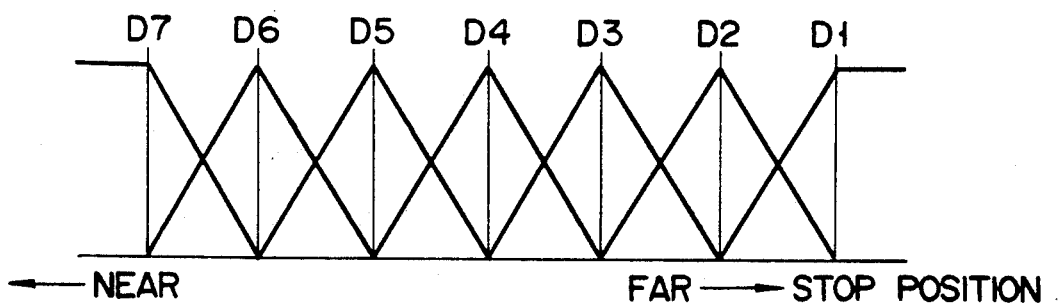

FIGS. 5A and 5B show membership functions for executing the fuzzy inference. FIG. 5A shows membership functions of the speed of the motor 2, i.e., the measured number of pulses generated by the photo-interrupter 10. Seven membership functions S1 to S7 are defined. For example, S1 indicates that the interval of the pulses generated by the photo-interrupter 10 is substantially 1 ms or more; S7, 20 ms or more; and S4, substantially 10 ms.

FIG. 5B shows membership functions of estimated stop positions when the motor 2 is braked immediately. Membership functions D1 to D7 are defined. For example, D1 indicates that the number of pulses is substantially 64 or more; D7, substantially 1; and D4, substantially 32.

FIG. 6 shows rules table formed by utilizing the membership functions described above. The interval of pulses currently generated by the photo-interrupter 10 and the interval of pulses generated last time by the photo-interrupter 10 are used as inputs of the fuzzy inference.

In the case of Ⓐ, both the current and last times correspond to S1 (uniform motion at a considerably high speed), and thus the motor 2 stops with a pulse D1 (will not stop easily).

In the case of Ⓑ, the last time corresponds to S1 (considerably high speed) and the current time corresponds to S6 (considerably low speed). Therefore, the motor 2 is decelerated and stops with a pulse D6 (will stop immediately).

In the case of Ⓒ, the last time corresponds to S4 (intermediate speed) and the current time corresponds to S2 (high speed). Therefore, the motor 2 is accelerated and will need the pulse D1 before stopping (will not stop easily).

In this manner, when predetermined rules are formed, even if the speed is changed under a condition other than the three patterns shown in FIG. 4, or even if the speed at the point P is different from that of this example, the estimated number of pulses N required for stopping can be inferred regarding all the cases. This inference is performed by obtaining a barycenter of the inference result from a relevant condition in accordance with, e.g., MIN (minimum value)—MAX (maximum value) emphasis. The examples of the inference method are currently described in many periodicals and the like. Only literatures will be listed below and a detailed description thereof will be omitted.

"Application of fuzzy algorithms for control of simple dynamic plant", *PROC.IEEE, Vol.* 121, *No.* 12, *DECEMBER* 1974, E. H. Mamdani.

As a fuzzy inference apparatus, a technique of a fuzzy inference IC chip of previous applications to be described below which are assigned to the same assignee can be utilized.

(i) U.S. patent application Ser. No. 426,576
   Filing date: Oct. 24, 1989
   Title: Digital Fuzzy Inference System
(ii) U.S. patent application Ser. No. 536,444
   Filing date: Jun. 12, 1990
   Title: Time-divisional Control Function The operation of lens extension control of the apparatus having this structure will be described with reference to the flow chart of FIG. 7. First, the CPU 102 sets lens target position information, obtained by automatic focus adjustment by the distance measuring unit 104 shown in FIG. 2A, in the target position memory unit 17 comprising a RAM or the like (step S1). The speed counter 11 is started and the motor 2 is turned on (steps S2 and S3). Then, the CPU 102 sequentially checks whether the speed counter 11 overflows (step S4) and whether a pulse from the photo-interrupter 10 rises (step S5). If YES in step S4, the CPU 102 determines that the output from the photo-interrupter 10 did not change for a predetermined period of time, and the flow advances to abnormality processing. If the lens is already at the target position (YES in step S6), control is ended, and the CPU 102 ends the control operation.

If the output from the photo-interrupter 10 rises in step S5, the CPU 102 resets timer interruption for turning off the motor 2 (to be described later) (step S7). The CPU 102 increments the count of the position counter 15 by one, thereby counting the current position (step S8). When the pulse generated by the photo-interrupter 10 falls, the CPU 102 resets the speed counter 11 to restart counting (step S9).

Subsequently, the CPU 102 causes the value (speed) $t_n$ currently measured by the speed counter 11 and the value (speed) $t_{n-1}$ measured last time which is stored in the latch unit 14 to be input in the stop position arithmetic operation unit 13, and calculates lens stop position information when the motor 2 is braked in accordance with the fuzzy inference described above (step S10). The CPU 102 also causes the currently measured value tn to be stored in the latch unit 14 for calculating a next stop position. (step S11). Subsequently, the CPU 102 supplies the calculation result N of the stop position arithmetic operation unit 13 to the adder 16 together with the count of the position counter 15. The calculation result N and the count of the position counter 15 are summed by the adder 16 to obtain the estimated stop position information (step S12). Then, the CPU 102 supplies the obtained estimated stop position information to the target position comparing unit 18. The estimated stop position information is compared by the comparing unit 18 with the target position stored in the target position memory unit 17. The motor 2 is controlled by the motor control unit 19 in accordance with the comparison result (steps S13 to S18). More specifically, in step S13, when the lens is to be stopped at the target position, the motor 2 is braked (step S14). In step S15, when the lens is to be stopped slightly before the target position, the motor 2 is turned off (step S16); when it is to be stopped farther before that, the motor 2 is turned on (step S18).

When the motor 2 is turned on, the timer is set so that an interrupt signal will be generated when a predetermined period of time elapses (step S17). When the interrupt signal is generated, the motor 2 is turned off (or braked). When the motor 2 almost stops (when the lens is close to the target position and the inference result is ON), the interval (time interval) of the pulses generated by the photo-interrupter becomes very long. If the motor 2 is turned on in this state, it will be excessively accelerated. The ON time of the motor 2 is limited to the predetermined period of time as described above because of this. Then, when the motor 2 is slowing down, it is kept ON for the predetermined period of time to be accelerated. When the motor 2 is driven fast, the interval (time interval) of the pulses generated by the photo-interrupter 10 is shorter than this predetermined period of time, and thus the ON state of the motor 2 will not be interrupted until the next calculation.

Figures 8A, 8B:
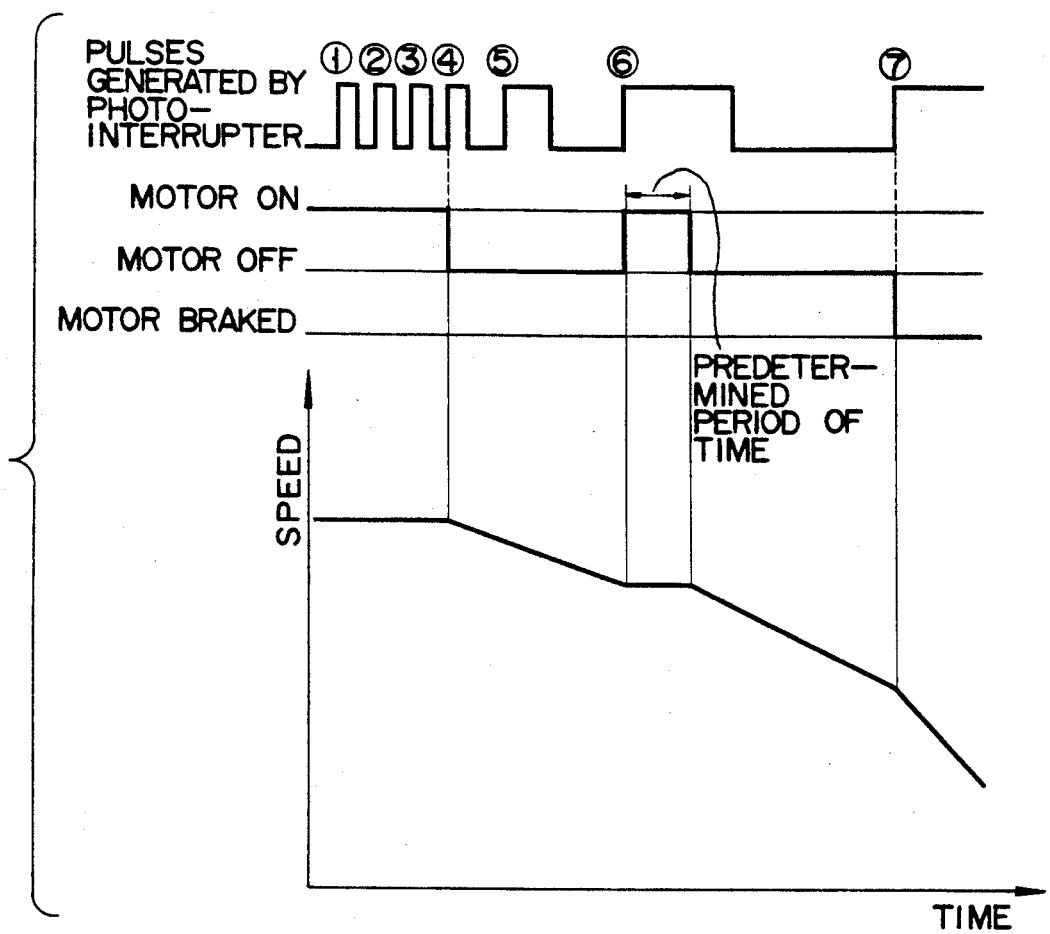
FIGS. 8A and 8B are views for explaining motor driving control by a fuzzy inference.

FIG. 8A shows an example of this driving control. FIG. 8B shows a relationship between the calculation results of the estimated stop positions and the motor control operations at time points ① to ⑦. As is seen from FIG. 8B, between the time points ① to ④, once the motor 2 is turned on, it is kept on as the interval of the pulses generated by the photo-interrupter 10 is shorter than the predetermined period of time. Between the time points ④ to ⑥, the motor 2 is kept off. At the time point ⑥, the motor 2 is turned on as the pulse interval is longer. Then, when a predetermined period of time elapses, the motor 2 is turned off to prevent excessive acceleration. At the time point ⑦, the motor 2 is braked to stop the lens at the target position.

The control of the motor 2 will be described. To turn on the motor 2 means to supply a drive current to it. To turn off the motor 2 means not to supply the drive current to it, and the motor 2 is driven only by the inertia force. To brake the motor 2 means not only not to supply the drive current to it but also to supply a counter electromotive force induced in the motor coil to the closed loop, thereby forcibly stopping the motor 2 by so-called opposite-phase braking.

FIG. 8C shows a practical arrangement of the motor control unit 19. In a motor control circuit 190 of this arrangement, one terminal of a reversible motor 70 is connected to the emitter of a transistor T1 and the collector of a transistor T2. The other terminal of the reversible motor 70 is connected to the emitter of a transistor T3 and the collector of a transistor T4. The collector of the transistor T1 and the emitter of the transistor T2 are connected to the positive and negative poles, respectively, of a battery 44. The bases of the transistors T1 and T2 are connected to terminals C1 and C2, respectively, of the CPU 102. The collector of the transistor T3 and the emitter of the transistor T4 are connected to the positive and negative poles, respectively, of the battery 44. The bases of the transistors T3 and T4 are connected to terminals C4 and C3, respectively, of the CPU 102.

In the control circuit 190 having the above arrangement, when the reversible motor 70 is to be turned on and driven in the forward direction, the terminals C1 and C2 of the CPU 102 are set low, and the terminals C3 and C4 of the CPU 102 are set high Then, the transistors T1 and T4 are turned on, and the transistors T1 and T3 are turned off. As a result, the current flows in the direction of the solid line in FIG. 8C, and the motor 70 is driven in the forward direction. However, when a drive gear 70a of the reversible motor 70 is to be rotated in the reverse direction, the terminals C1 and C2 of the CPU 102 are set high, and the terminals C3 and C4 are set low. Then, the transistors T2 and T3 are turned on, and the transistors T1 and T4 are turned off. As a result, the current flows in the direction of the broken line in FIG. 8C, and the motor is driven in the reverse direction. When the reversible motor 70 is to be braked, all the terminals are set high. Then, the transistors T2 and T4 are turned on, while the transistors T1 and T3 are turned off, and thus the motor 70 is short-circuited by the transistors T2 and T4. As a result, the motor 70 is immediately stopped by the counter electromotive force generated by the motor 70 itself.

When the motor 70 is to be turned off, the terminals C1 and C4 of the CPU 102 are set high and the terminals C2 and C3 of the CPU 102 are set low. Then, all the transistors T1 to T4 are turned off. In this state, the motor 70 is driven by the inertia force as it is in an open loop, and then gradually stops.

FIG. 9A shows the general idea of the present invention when it is applied to camera film wind control. A wind motor 108 winds a film 109. The movement of the film 109 is converted by an encoder 110 into an electrical signal and is input to a CPU 102a which functions in the same manner as that of FIG. 2A.

Figure 9B:
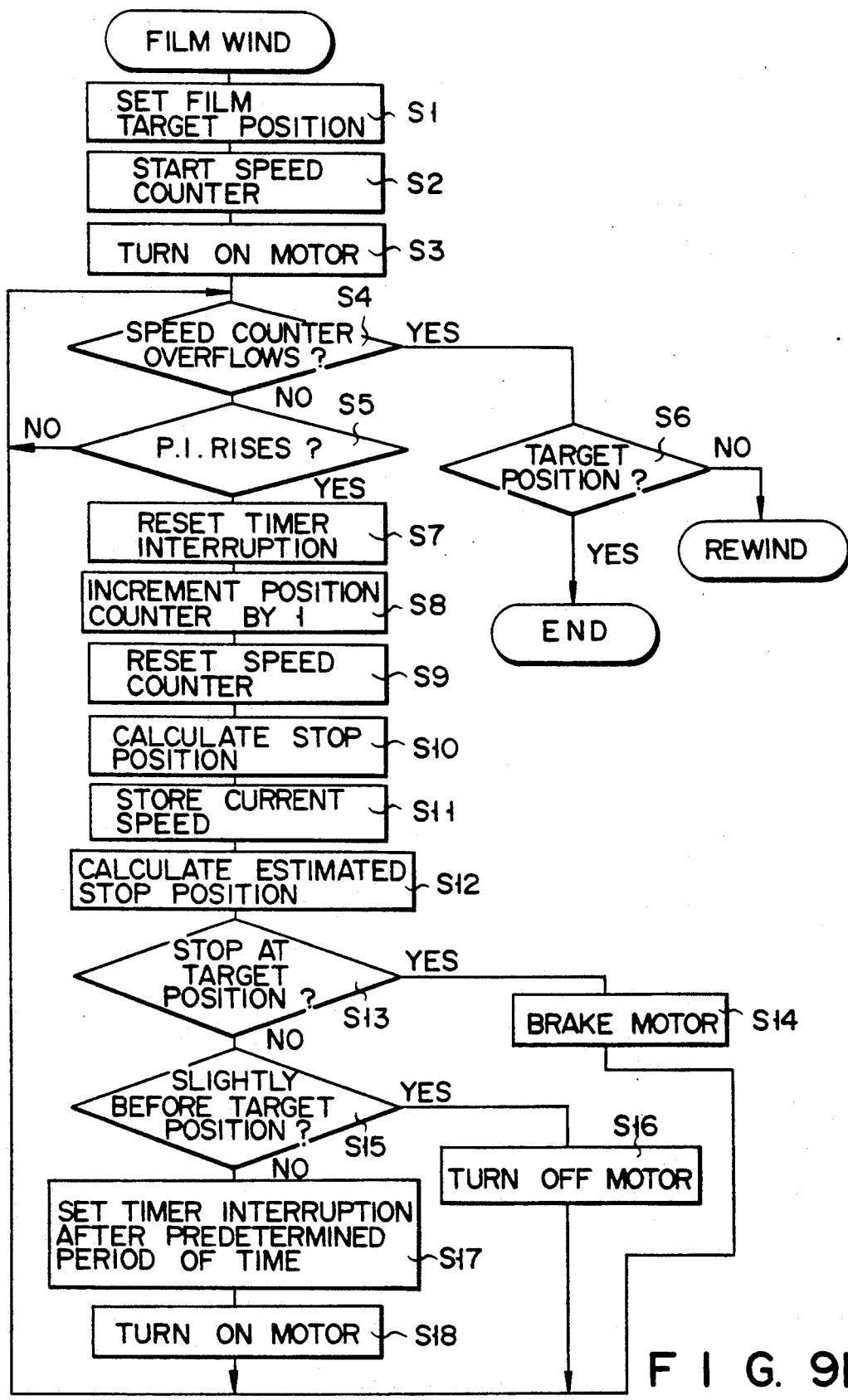
FIG. 9B is a flow chart for explaining the operation of film wind control.

FIG. 9B is a flow chart of the present invention in FIG. 9A when it is applied to camera film wind control. When a film is wind by one frame, the number of the target pulses is determined to correspond to one frame. The film wind control of FIG. 9B is different from the lens extension control of FIG. 7 in that, in the former case, an output from the photo-interrupter 10 is not changed unlike in the latter case, then the timer overflows during counting, it is determined that the film has ended, and a rewind operation is automatically started. Except for that, the motor driving control of FIG. 9B is completely the same as that of FIG. 7.

Figure 10:
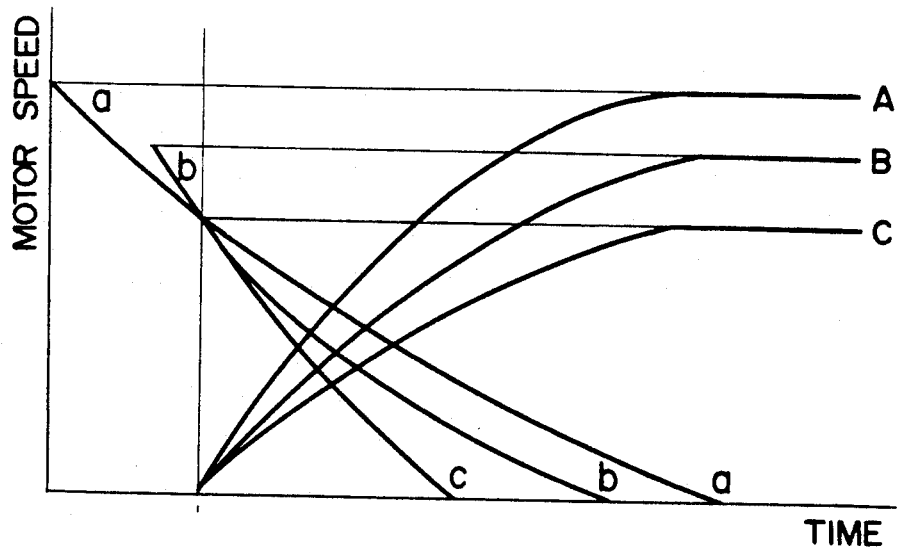
FIG. 10 is a graph showing a relationship between starting and braking characteristics of a motor.

Another embodiment of the present invention will be described. FIG. 10 shows the motor rotation characteristics when the motor load is changed. Reference symbols A to C denote the characteristics during motor starting; and a to c, the characteristics during motor braking. The motor load is heavier in the order of A to C and a to c. A, B, and C correspond to a, b, and c. For example, when the motor started with the characteristic A is braked, the motor braking characteristic is a. When the motor started with the characteristic B is braked, the motor braking characteristic is b.

A heavy load means that a lens drive unit has a large friction, the film itself has a large friction, the battery voltage is low, or the like. More specifically, different cameras have different loads due to the variations in components. Even a single camera has different loads depending on the conditions, e.g., an ambient temperature, or whether the battery is new or old.

This embodiment is based on this fact. This embodiment is so designed that the rotational characteristics are determined almost only by the constant motor speed (maximum speed). More specifically, when the constant speed is high, braking cannot be easily achieved; when low, braking can be easily achieved.

Figure 11:
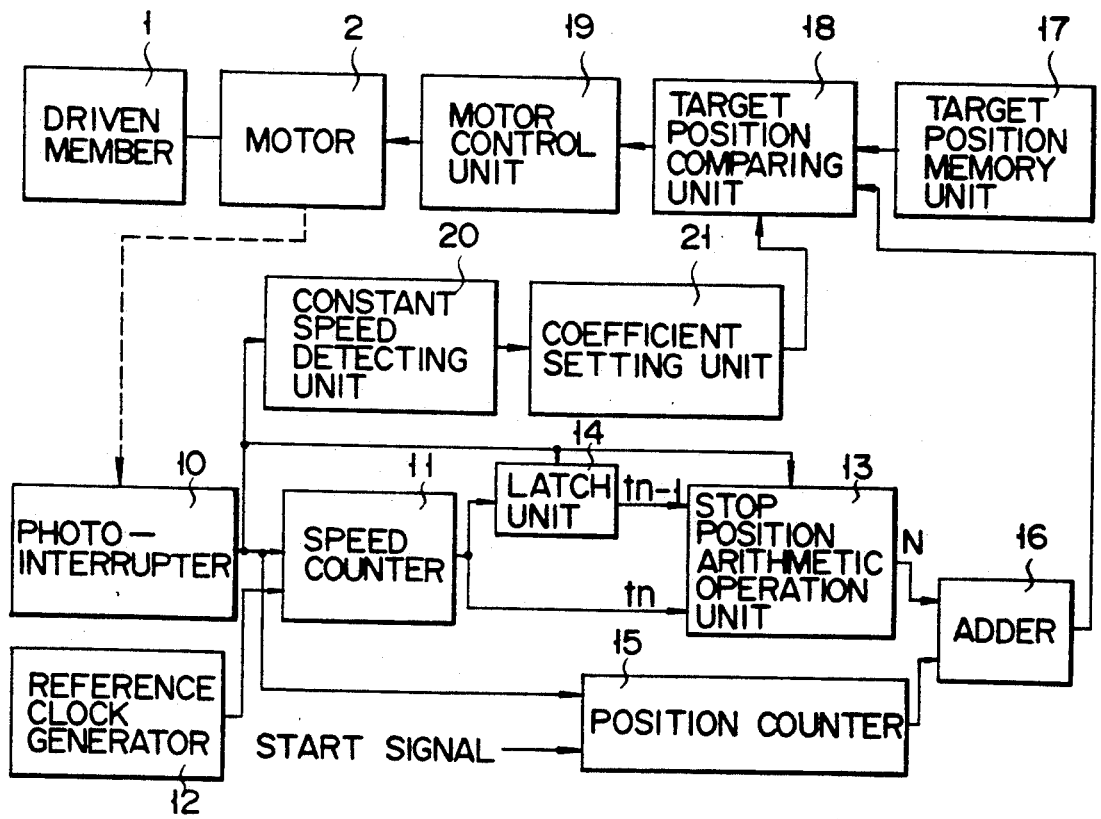
FIG. 11 is a block diagram schematically showing the structure of a motor driving control apparatus according to still another embodiment of the present invention.

FIG. 11 shows the arrangement of this embodiment. FIG. 11 is different from FIG. 2B only in that a constant speed detecting unit 20 and a coefficient setting unit 21 are added. Except for that, the arrangement of FIG. 11 is the same as that of FIG. 2B. More specifically, the constant speed detecting unit 20 detects that the speed of a motor 2 has reached a constant value and outputs the detected speed to the coefficient setting unit 21. The coefficient setting unit 21 changes the motor control determination of a normal state (e.g., the starting characteristic A) in accordance with the speed. However, when the motor 2 does not reach the constant value, a predetermined coefficient is used.

FIG. 12 shows an example of control determination in accordance with different starting characteristics (braking characteristics).

With the starting characteristic A (braking characteristic a), the motor is braked one pulse before the target position, is OFF 2 to 8 pulses before the target position, and is ON farther from the target position than that, as shown in a box A-a. With the starting characteristic B, the motor OFF range is 2 to 6 pulses before the target position, as shown in a box B-b. With the starting characteristic C, the motor OFF range is 2 to 4 pulses before the target position, as shown in a box C-c.

When the control determination is made in this manner, the motor is kept on until it is closest to the target position in accordance with the controlled motor characteristic and is stopped at the target position. Therefore, the lens can be moved more quickly to the target position.

In this embodiment, three types of characteristics A, B, and C are prepared. However, the number of characteristic types can be more than that. If a characteristic between A and B, or B and C is set, corresponding control determination can be interpolated from the boxes A-a and B-b or B-b and C-c. Interpolation can be performed based on the fuzzy inference.

FIG. 13 shows an example of control in which the motor control operation does not only include ON/OFF control and braking but also duty driving. In this case, smoother lens movement control can be performed. Regarding duty driving, the duty ratio can be changed depending on the number of pulses until the target position, or the motor driving voltage can be changed in place of the duty ratio.

FIG. 14 shows still another embodiment of the present invention. In FIG. 14, the stop position arithmetic operation unit 13 as a part of the FIGS. 2B and 11 is replaced by a table data memory unit 23 (a memory, e.g., a ROM, a RAM, or an E²-PROM). The table data memory unit 23 stores control data (a determined barycenter value in the case of fuzzy control) which is obtained in advance by the fuzzy inference or the like. For example, in the algorithm of FIG. 2B, assume that the stop position arithmetic operation unit 13 is constituted by a 2-input 1-output fuzzy inference apparatus or the like. When lens index control is performed, the output N from the stop position arithmetic operation unit 13 is the result (in this case, the determined value output including the barycenter) of the fuzzy inference in accordance with the inputs $t_{n-1}$ and $t_n$. More specifically, when the barycenter output with respect to the two inputs ($t_{n-1}$, $t_n$) is adjusted to an optimal value, this control system performs smooth lens index control. Assuming that the inputs $t_{n-1}$ and $t_n$ represent values ($t_{n-1}$, $t_n$) which are not much different in performing control, the stop position arithmetic operation unit 13 needs only one input. Thus, when the output value of the speed counter 11 is used for address designation of the table data memory unit 23, optimum control data according to a given speed can be obtained as the output N without performing complicated calculation.

FIG. 15 shows a graph in which an output value of the speed counter 11 designates a table data value of the table data memory unit 23. Table addresses CV1 and CV2 satisfy CV1<CV2. Table data values GV1 and GV2 satisfy GV1>GV2. As is apparent from FIG. 15, when the speed is high, the output value from the speed counter 11 is small, and the table data value is GV1 which is large, as is designated by the value CV1. However, when the speed is low, the output value from the speed counter 11 is large, and the table data value is a small GV2, as is designated by the value CV2. In this manner, when a control most likely to cause an arithmetic operation time lag is performed by referring to a table, a high-speed operation is enabled.

Figure 7:
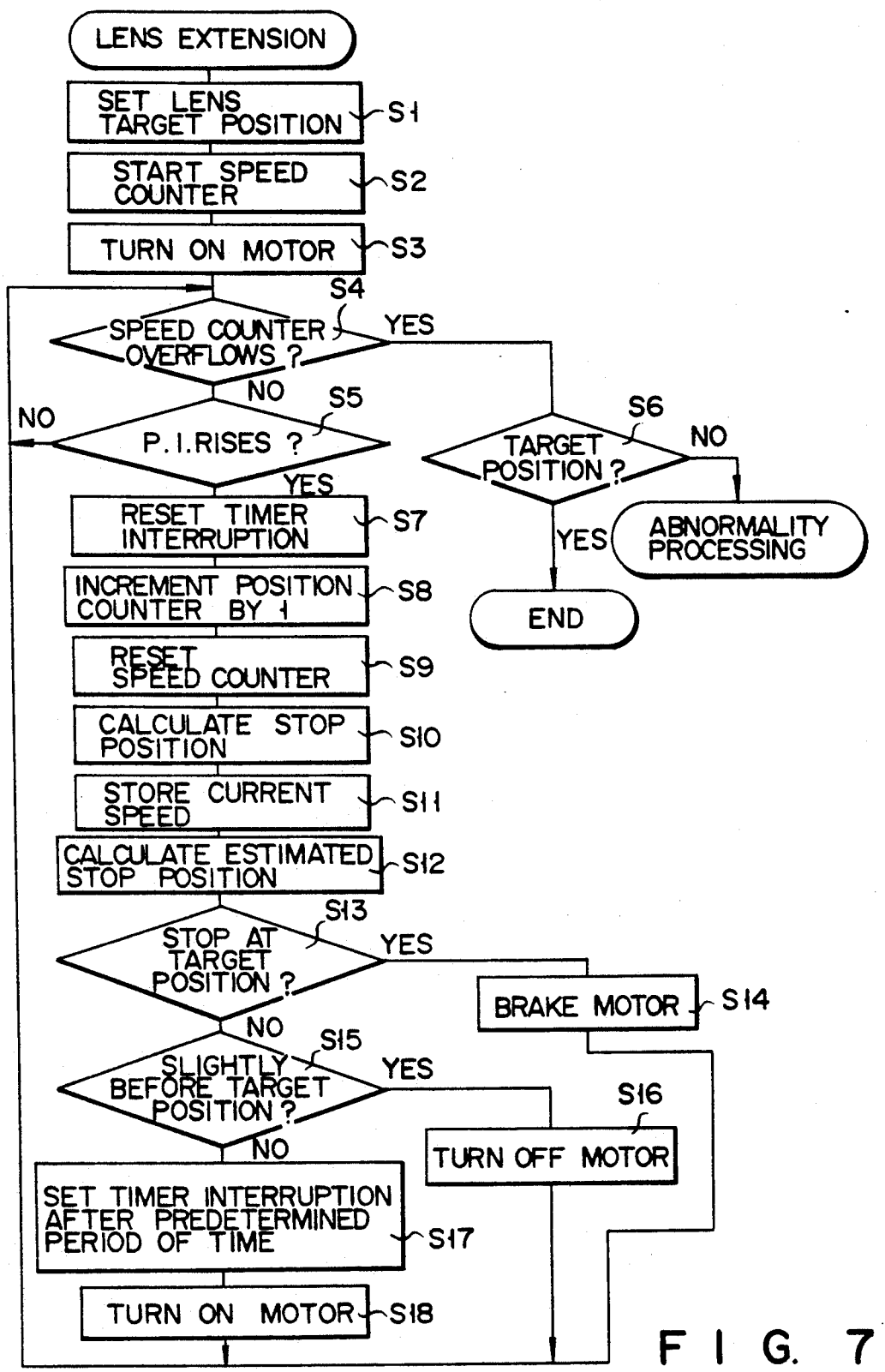
FIG. 7 is a flow chart for explaining the operation of a lens extension control.
Figure 16:
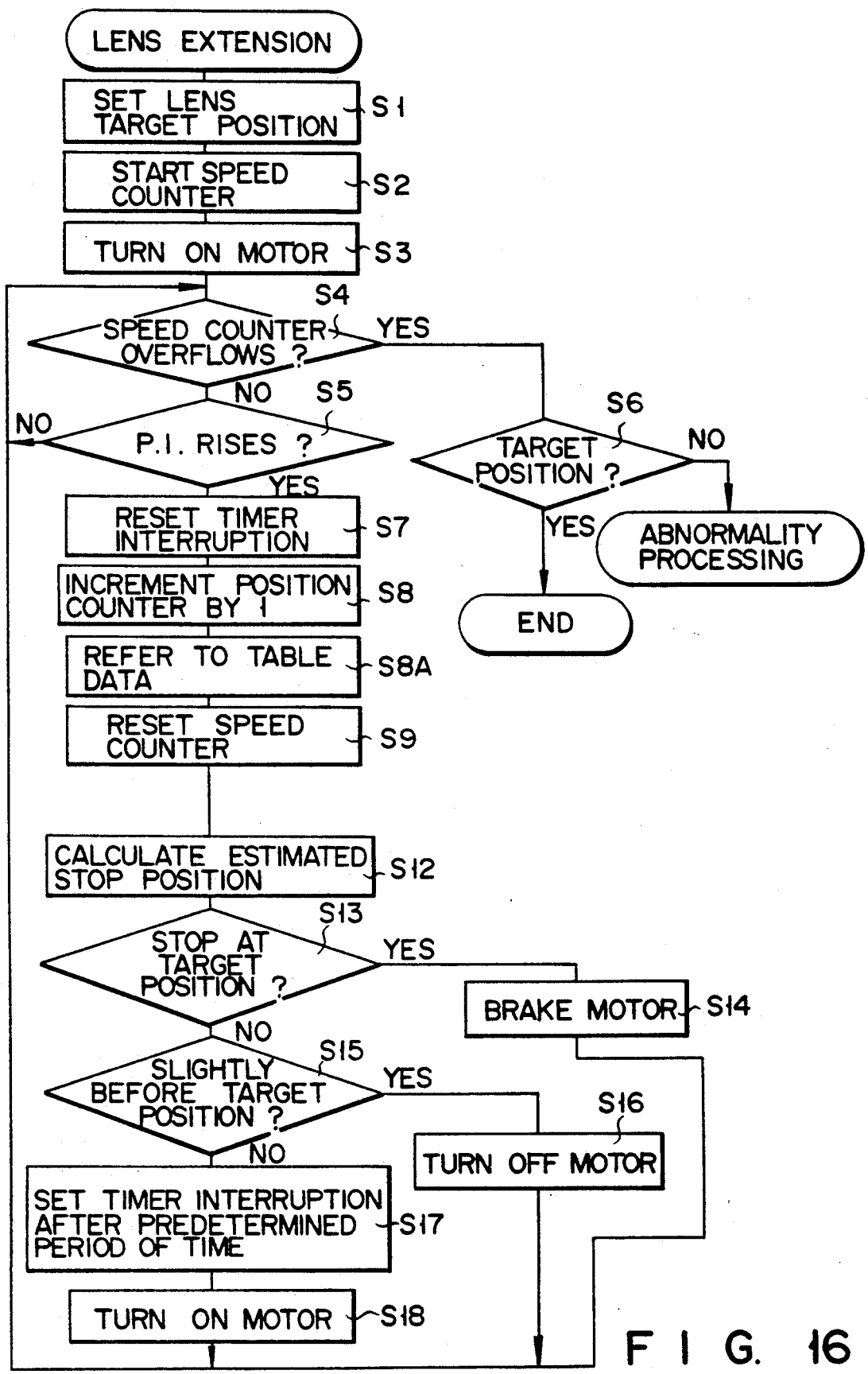
FIG. 16 is a flow chart for explaining the operation of the apparatus of FIG. 14.

FIG. 16 is a flow chart in which steps S10 and S11 of FIG. 7 are omitted and a step of referring to table data (step S8A) is inserted between the steps S8 and S9 in order to explain the operation of the arrangement of FIG. 14. When a lens extension stop target position is set in the target position memory unit 17 (step S1), a reference clock is supplied from the reference clock generator 12 to the speed counter 11, and counting of the speed of the photo-interrupter 10 in units of periods is started (step S2). Simultaneously with the start of counting by the speed counter 11, the motor is turned on (step S3), and a P.i. pulse of the photo-interrupter 10 proportional to a position displacement of the driven member 1 is generated. The P.i. pulse updates the count of the speed counter 11 every time it rises (one period), and increments the count of the position counter 15 (steps S5 to S8). The P.i. pulse is also used as a period signal of a reference timing of the table data memory unit 13. Table data designated by the output signal from the speed counter 11 is added to an output value from the position counter 15 by the adder 16 and is output to the target position comparing unit 18 (step S8A). More specifically, this output value is the estimated stop position (step S12). The target position comparing unit 18 compares the output value with a value (lens index stop target position) of the target position memory unit 17 in order to determine the control state (one of three states of motor ON, motor OFF, motor braking) of the motor (steps S13 to S18). The above operation is performed until the driven member stops at a predetermined target position. When an abnormality occurs in the driven member 1, an overflow of the speed counter 11 is detected (step S4), and abnormality processing is immediately performed (step S6).

The technique of referring to the table data, as in this embodiment, can be applied to film wind (FIG. 9B) in the same manner.

As has been described above, in this embodiment, control is performed by using the current motor speed and the last motor speed as inputs to consider the load to the system. More specifically, in conventional control using a deceleration curve, a certain speed is fixed in accordance with the number of remaining pulses until the target without considering the load (the temperature, the battery voltage, the direction, and so on) during control. In contrast to this, in this embodiment, not only the current speed but also other conditions such as acceleration or deceleration are considered. Therefore, ideal control to reach a target position can be performed by considering the current state of the system. In practice, the number of control times, e.g., ON/OFF and braking of the motor 2 is decreased.

In fine, according to the present invention as described above, there is provided a motor driving control apparatus capable of stopping a driven member at a target position accurately and quickly while shortening the control time by decreasing the number of motor control times, e.g., ON/OFF and braking.

Furthermore, the present invention can be realized by using a hardware technique combined well-known circuits, without limiting in case of a software technic using a CPU as described above.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A motor driving control apparatus comprising:
   a motor for driving a driven member;
   target position output means for outputting stop target position information of said driven member;
   encoder means for generating pulses in accordance with a movement of said driven member;
   speed detecting means for detecting a speed of said driven member by using the pulses from said encoder means and for outputting speed data;
   memory means for storing the speed data output by said speed detecting means;
   movement distance arithmetic operation means for estimating and calculating a movement distance of said driven member until stopping by using the speed data stored in said memory means and current speed data detected by said speed detecting means when a motor stop operation is immediately started;
   position detecting means for detecting current position information of said driven member by counting the pulses from said encoder means;
   stop position arithmetic operating means for calculating estimated stop position information of said driven member by adding the current position information of said driven member, which is detected by said position detecting means, with the movement distance until stopping which is calculated by said movement distance arithmetic operating means;
   comparing means for comparing stop target position information output by said target position output means with the estimated stop position information calculated by said stop position arithmetic operating means; and
   motor control means for controlling said motor in accordance with a result of said comparing means.

2. An apparatus according to claim 1, wherein said estimated stop position arithmetic operating means includes means for receiving current speed data detected by said speed detecting means and speed data stored in said memory means and calculating a movement distance until stopping when said motor is immediately braked, based on a fuzzy inference.

3. An apparatus according to claim 1, wherein said motor control means includes means for controlling said motor to brake said motor when a difference between the stop target position information and the estimated stop position information, obtained by comparison by said stop position comparing means, is less than a first predetermined value, to turn off said motor when the difference between the stop target position information and the estimated stop position information is less than a second predetermined value which is smaller than the first predetermined value, and to turn on said motor in other cases.

4. An apparatus according to claim 3, wherein said motor is kept on by said motor control means for a predetermined period of time after a comparison result obtained by said comparing means is output.

5. An apparatus according to claim 1, wherein said driven member includes a lens driving member for focus adjustment of a camera.

6. An apparatus according to claim 1, wherein said driven member includes a wind member for winding a film of a camera.

7. An apparatus according to claim 1, wherein said apparatus further comprises constant speed detecting means for detecting constant speed information on the basis of an output from said encoder means, and a coefficient setting unit for determining a coefficient which changes an output of a comparison result of said stop position comparing means on the basis of the constant speed information from said constant speed detecting means.

8. An apparatus according to claim 1, wherein comparison by said comparing means is performed in response to a pulse generated by said encoder means.

9. A motor driving control apparatus for driving a driven member by a motor and stopping the driven member at a target position, comprising:
   means for generating pulses in accordance with a movement of said driven member;
   speed detecting means for detecting movement speed information of said driven member from the pulses generated by said pulse generating means;
   memory means for storing the movement speed information of said driven member which is detected by said speed detecting means;
   position detecting means for counting the pulses generated by said pulse generating means and detecting current position information of said driven member;
   arithmetic operation means for receiving an output from said speed detecting means, an output from said memory means, and an output from said position detecting means, and for estimating and calculating stop position information of said driven member when driving of said motor is stopped;
   target position output means for outputting stop target position information of said driven member;
   comparing mean for comparing estimated stop position information of said arithmetic operation means with the stop target position information from said target position output means; and
   control means for controlling power supply to said motor in accordance with a result of said comparing means to supply power to said motor when the estimated stop position information represents a position before that represented by the target position information by not less than a first predetermined value, to stop power supply to said motor when estimated stop position information is between the first predetermined value and a second predetermined value, the second predetermined value being not more than the first predetermined value and closer to a value corresponding to a target position than the first predetermined value, and to brake said motor when the estimated stop position information represents a position before that represented by the target position information and represents a value smaller than the second predetermined value.

10. An apparatus according to claim 9, wherein said apparatus further comprises:
detecting means for detecting constant speed information of said driven member; and
changing means for changing the first or second predetermined value in accordance with constant speed information detected by said detecting means.

11. A motor driving control apparatus for driving a driven member by a motor and stopping said driven member at a target position, comprising:
means for generating pulses in accordance with a movement of said driven member;
speed detecting means for detecting movement speed information of said driven member from the pulses generated by said generating means;
memory means for storing the movement speed information of said driven member which is detected by said speed detecting means;
position detecting means for counting the pulses generated by said pulse generating means and detecting current position information of said driven member;
arithmetic operation means for receiving an output from said speed detecting means, an output from said memory means, and an output from said position detecting means, and for estimating and calculating stop position information of said driven member when driving of said motor is stopped;
target position output means for outputting stop target position information of said driven member;
comparing means for comparing estimated stop position information of said arithmetic operation means with the stop target position information from said target position output means; and
control means for controlling driving of said motor in accordance with a result of said comparing means.

12. An apparatus according to claim 11, wherein said arithmetic operation means comprises a fuzzy inference unit for receiving the current movement speed information of said driven member which is an output from said speed detecting means and the last movement speed information as an output from said memory means, and an adding unit for adding an output from said fuzzy inference unit and an output from said position detecting means.

13. An apparatus according to claim 11, wherein, as a result of said comparing means, said control means supplies power to said motor when the estimated stop position information represents a position before that represented by the target position information by not less than a predetermined value, does not supply power to said motor when the estimated stop position information is between the predetermined value and the target position information, and brakes said motor when the estimated stop position information represents a position substantially the same as that represented by the target position information.

14. An apparatus according to claim 11, wherein said control means sets the first, second, third, fourth, and fifth regions at portions which are closer to the target position in the order named with respect to the target position information, and, as a result of comparison by said comparing means, continuously keeps said motor in a short-circuited state when the estimated stop position information represents a position falling within the first region, alternately repeats non-application of a drive voltage to said motor and short-circuiting of said motor when the estimated stop position information represents a position falling within the second region, does not continuously apply the drive voltage to said motor when the estimated stop position information represents a position falling within the third region, alternately repeats non-application and application of the drive voltage to said motor when the estimated stop position information represents a position falling within the fourth region, and continuously applies the drive voltage to said motor when the estimated stop position information represents a position falling within the fifth region.

15. A motor driving control apparatus for stopping a driven member, which is driven by a motor, at a target position, comprising:
speed detecting means for detecting a value corresponding to a movement speed of said driven member and outputting the detected value as speed data;
memory means for storing the speed data detected by said speed detecting means;
movement distance arithmetic operation means for receiving current speed data detected by said speed detecting means and speed data stored in said memory means and immediately estimating and calculating a movement distance until stopping by using a fuzzy inference when a stop operation of said motor is started;
moved member distance detecting means for detecting a moved member distance to a current position of said driven member;
estimated stop position arithmetic operation means for calculating an estimated stop position by using an estimated movement distance obtained by said movement distance arithmetic operation means and a current moved member distance obtained by said moved member distance detecting means; and
motor control means for comparing a target position and the estimated stop position of said driven member and controlling said motor in accordance with a comparison result.

16. An apparatus according to claim 15, wherein said motor control means includes means for controlling said motor to brake said motor when a difference between a stop target position and an estimated stop position is not more than a first predetermined value, to turn off said motor when the difference between the stop target position and the estimated stop position is not more than a second predetermined value which is less than the first predetermined value, and to turn on said motor in other cases.

17. An apparatus according to claim 16, wherein said apparatus further comprises constant speed detecting means for detecting a constant speed of said motor, and the second and first predetermined values are changed in accordance with the constant speed.

18. An apparatus according to claim 15, wherein the fuzzy inference by said movement distance arithmetic operation means is executed in response to a pulse generated by said encoder means, and said motor control means changes a control output in accordance with an output of said movement distance arithmetic operation means.

19. A motor driving control apparatus for stopping a driven member, driven by a motor, at a target position, comprising:

encoder means for generating pulses in response to a movement of said driven member;

speed detecting means for detecting a speed of said driven member by using the pulses from said encoder means and outputting speed data;

memory means for storing the speed data detected by said speed detecting means;

movement distance arithmetic operation means for estimating and calculating a movement distance until stopping by using the speed data stored in said memory means and current speed data detected by said speed detecting means when a drive stop operation is immediately started; and control means for determining a position of said driven member relative to the stop target position when said motor is stopped after movement by the estimated movement distance obtained by said movement distance arithmetic operation means, and controlling said motor on the basis of the determination result.

20. An apparatus according to claim 19, wherein said movement distance arithmetic operation means includes means for performing an estimative arithmetic operation by using a fuzzy inference.

21. An apparatus according to claim 19, wherein said movement distance arithmetic operation means includes means for performing an estimative arithmetic operation in response to generation of the pulses by said encoder means.

22. A motor driving control apparatus for driving a driven member by a motor and stopping said driven member at a target position, comprising:

means for detecting movement speed data of said driven member;

means for storing movement speed data from said detecting means;

means for estimating a position where said driven member stops when said motor is controlled to stop, on the basis of the last movement speed data stored in said memory means and current movement speed data as an output from said detecting means; and driving control means for performing driving control of said motor on the basis of a result of said estimating means and the target position.

23. An apparatus according to claim 22, wherein said driving control means selects, in accordance with a result of said estimating means, either one of motor ON means for applying a drive voltage to said motor, motor open means for causing said motor to operate by an inertia without applying a drive voltage to said motor, and motor braking means for braking said motor by short-circuiting said motor, and controls said motor by said selected means.

24. A motor driving control means for driving a driven member by a motor and stopping said driven member at a target position, comprising:

means for detecting movement speed data of said driven member;

means for storing the movement speed data from said detecting means;

means for receiving last movement speed data stored in said memory means and current movement speed data as an output from said detecting means and executing a fuzzy inference based on a predetermined plurality of rules, thereby estimating a position where said driven member stops when said motor is controlled to stop; and driving control means for repeatedly performing driving control of said motor based on a result of said estimating means and the target position.

25. A driving control apparatus of a driven member driven by a motor, comprising:

speed detecting means for detecting driving speed data of said motor;

stop position estimative arithmetic operation means for estimating and calculating stop position information when said motor is controlled to stop, on the basis of current and past driving speed data detected by said speed detecting means; and control means for controlling said motor by using at least stop position information estimated by said stop position estimative arithmetic operation means.

26. An apparatus according to claim 25, wherein said apparatus comprises pulse generating means for generating pulses in response to a movement of said driven member, said speed detecting means outputs speed data based on the pulses from said pulse generating means, and said stop position estimative arithmetic operation means estimates and calculates the stop position means.

27. A driving control apparatus for driving a driven member by a motor and stopping said driven member at a stop position, comprising:

means for detecting movement speed data of said driven member;

means for storing the movement speed data from said detecting means;

means for discriminating a characteristic of said motor;

means for estimating a position where said driven member stops when said motor is controlled to stop, on the basis of last movement speed data stored in said memory means and current movement speed data as an output from said detecting means; and driving control means for performing driving control of said motor based on an estimation result of said estimating means, the target position, and the motor characteristic obtained by said discriminating means.

28. An apparatus according to claim 27, wherein said discriminating means detects a constant speed of said driven member and discriminates the characteristic of said motor in accordance with the detected constant speed.

29. A control apparatus for stopping a driven member, driven by a motor, at a target position, comprising:

speed detecting means for detecting a value corresponding to a movement speed of said driven member and outputting the detected value as speed data;

movement distance arithmetic operation means for estimating and calculating a movement distance of said driven member until stopping when a driving stop operation of said motor is immediately started, by using the speed data detected by said speed detecting means and in accordance with a fuzzy inference;

moved member distance detecting means for detecting present moved member distance of said driven member;

estimated stop position arithmetic operation means for calculating an estimated stop position by using the moved member distance obtained by said moved member distance detecting means and the movement distance obtained by said movement distance arithmetic operation means; and motor control means for comparing a target position of said driven member with the estimated stop position obtained by said estimated stop position arithmetic operation means and controlling said motor in accordance with a comparison result.

30. An apparatus according to claim 29, wherein said speed detecting means has encoder means for generating pulses upon movement of said driven member and outputs speed data by detecting an interval of the pulses; and an estimative arithmetic operation by said movement distance arithmetic operation means is performed in response to generation of a pulse by said encoder means.

31. A control apparatus for stopping a driven member, driven by a motor, at a target position, comprising speed detecting means for detecting a driving speed of said motor;

stop position estimative arithmetic operation means for estimating and calculating stop position information of a case when said motor is caused to immediately stop by using a fuzzy inference and based on the speed data detected by said speed detecting means; and control means for controlling said motor by using at least the estimated stop position information obtained by said stop position estimative arithmetic operation means.

32. An apparatus according to claim 31, wherein: said apparatus further comprises pulse generating means for generating pulses in response to a movement of said driven member;

said speed detecting means outputs speed data based on the pulses from said pulse generating means; and the fuzzy inference of said stop position estimative arithmetic operation means is performed in response to the pulse from said pulse generating means.

33. A method of driving a driving apparatus comprising pulse generating means for generating pulses in response to a movement of a driven member driven by a motor, position detecting means for detecting a position of said driven member by counting the pulses, and target position outputting means for outputting a driving target position of said driven member, comprising the steps of:

detecting a movement speed of said driven member on the basis of the pulses;

storing the detected movement speed;

after storing the movement speed, detecting again a movement speed of said driven member on the basis of the pulses;

performing an estimative arithmetic operation of estimating the number of pulses that are generated by said pulse generated means until stopping when braking is performed immediately, by using the newly detected movement speed and the stored movement speed;

obtaining an estimated stop position by using an output from said position detecting means and a result of the estimative arithmetic operation;

comparing the estimated stop position with an output from said target position detecting means; and controlling said motor in accordance with a comparison result.

34. A method according to claim 33, wherein when a difference between the estimated stop position and the target position is larger than a second predetermined value as a result of the comparison, a voltage is supplied to said motor for a predetermined period of time.

35. A method according to claim 33, wherein when a difference between the estimated stop position and the target position is larger than a first predetermined value and less than a second predetermined value as a result of the comparison, a voltage to be supplied to said motor is cut off to cause said motor to drive by inertia.

36. A method according to claim 33, wherein when a difference between the estimated stop position and the target position is less than a first predetermined value as a result of the comparison, said motor is braked.

* * * * *